(12) United States Patent
Scholz

(10) Patent No.: US 7,341,270 B1
(45) Date of Patent: Mar. 11, 2008

(54) REAR CARRIER RACK FOR A FOLDING BICYCLE

(76) Inventor: N. Hanz Scholz, 87432 Halderson Rd., Eugene, OR (US) 97402

(*) Notice: Subject to any disclaimer, the term of this patent is extended or adjusted under 35 U.S.C. 154(b) by 289 days.

(21) Appl. No.: 11/213,194

(22) Filed: Aug. 25, 2005

(51) Int. Cl.
*B62K 7/04* (2006.01)
*B62J 7/00* (2006.01)

(52) U.S. Cl. .......... 280/287; 224/432; 224/444
(58) Field of Classification Search .......... 280/287, 280/278; 224/432, 444
See application file for complete search history.

(56) References Cited

U.S. PATENT DOCUMENTS

| | | | | |
|---|---|---|---|---|
| 4,111,447 A | * | 9/1978 | Ishida | 280/278 |
| 4,182,522 A | * | 1/1980 | Ritchie | 280/278 |
| 4,422,663 A | * | 12/1983 | Hon | 280/278 |
| 4,433,852 A | * | 2/1984 | Hon | 280/278 |
| 5,482,194 A | | 1/1996 | Hallock, III | |
| 5,794,958 A | * | 8/1998 | Hsiao | 280/287 |
| 6,336,649 B1 | * | 1/2002 | Lin | 280/278 |
| 6,425,598 B2 | * | 7/2002 | Murayama | 280/278 |

* cited by examiner

*Primary Examiner*—Tony Winner
(74) *Attorney, Agent, or Firm*—Robert E. Howard

(57) ABSTRACT

A rear rack for a folding bicycle. The rear rack includes right and left chassis bars and a support platform positioned above the chassis bars. Rear support struts are pivotally attached at their upper ends to the chassis bars adjacent their outer ends, the support struts having lower ends adapted to be pivotally attached to the rear dropout of a folding bicycle. Forward support struts are pivotally attached at their upper ends to the support platform adjacent its inner end, the lower ends adapted to be pivotally attached to the rear dropout. The forward support struts are releasably locked to the chassis bars when the rear rack is erected for carrying a load. A rear support strut is pivotally attached to the chassis bars adjacent their outer ends, and pivotally attached to the support platform.

9 Claims, 3 Drawing Sheets

REAR CARRIER RACK FOR A FOLDING BICYCLE

BACKGROUND OF THE INVENTION

The present invention relates to a collapsible and foldable rear carrier rack for a folding bicycle.

Folding bicycles or "travel bikes" were developed for users who need a bicycle that can be made into a compact package for transport and storage. Typically folding bicycles have mechanisms that enable the handle bars to be collapsed and the front wheel to be folded back to a position adjacent the rear wheel.

Although there are many types of rear racks for non-folding bicycles that are used to carry a pannier or other objects, they are too bulky to be used with a folding bicycle.

SUMMARY OF THE INVENTION

It is an object of the present invention to provide a rear carrier rack for a folding bicycle that can be collapsed when not in use.

It is a further object of the present invention to provide a rear carrier rack for a folding bicycle that can be folded downwardly when the bicycle is folded for transport or storage.

This summary of the rear rack of the present invention will be described relative to preferred embodiment features. Variations on these features are to be included within the scope of the invention, and some variations are discussed in the detailed description which follows.

The rear rack of the present invention includes right and left chassis bars having inner and outer ends. The inner ends of the chassis bars are adapted to be pivotally attached to the right and left top stays of a folding bicycle.

A support platform is positioned above the right and left chassis bars. The support platform includes right and left longitudinally extending frame members having inner and outer ends, a front tubular cross frame member extending between and attached to said right and left longitudinally extending tubular members adjacent the inner ends thereof, a rear tubular cross frame member extending between and attached to said right and left longitudinally extending tubular members adjacent the outer ends thereof, and a plurality of cross frame members extending between and attached to said right and left longitudinally extending frame members.

Right and left rear support struts have upper ends that are pivotally attached to the right and left chassis bars adjacent their outer ends. The lower ends of the right and left support struts are adapted to be pivotally attached to the rear dropout of a folding bicycle;

Right and left forward support struts are pivotally attached at their upper ends to the right and left longitudinally extending frame members of the support platform adjacent their inner ends. The right and left forward support struts have lower ends adapted to be pivotally attached to the rear dropout of a folding bicycle.

A generally inverted U-shaped rear support strut has right and left legs having upper and lower ends and a cross member extending between the upper ends of said right and left legs. The lower ends of the right and left legs are pivotally attached to the right and left chassis bars adjacent the outer ends thereof. The upper region of the right and left legs are pivotally attached to the rear tubular cross frame member of the support platform.

Means are provided for releasably locking the right and left forward support struts to the right and left chassis bars, respectively. Such means includes a pair of right locking pins located at a mid-portion of the outer surface of the right chassis bar and a pair of left locking pins located at a mid-portion of the outer surface of the left chassis bar. The pair of right locking pins are adapted to engage and hold the right forward support strut and the pair of left locking pins are adapted to engage and hold the left forward support strut. The right and left pairs of pins can be disengaged from said right and left forward support struts by moving the right and left chassis bars towards each other

DESCRIPTION OF PREFERRED EMBODIMENTS

Figure 1:
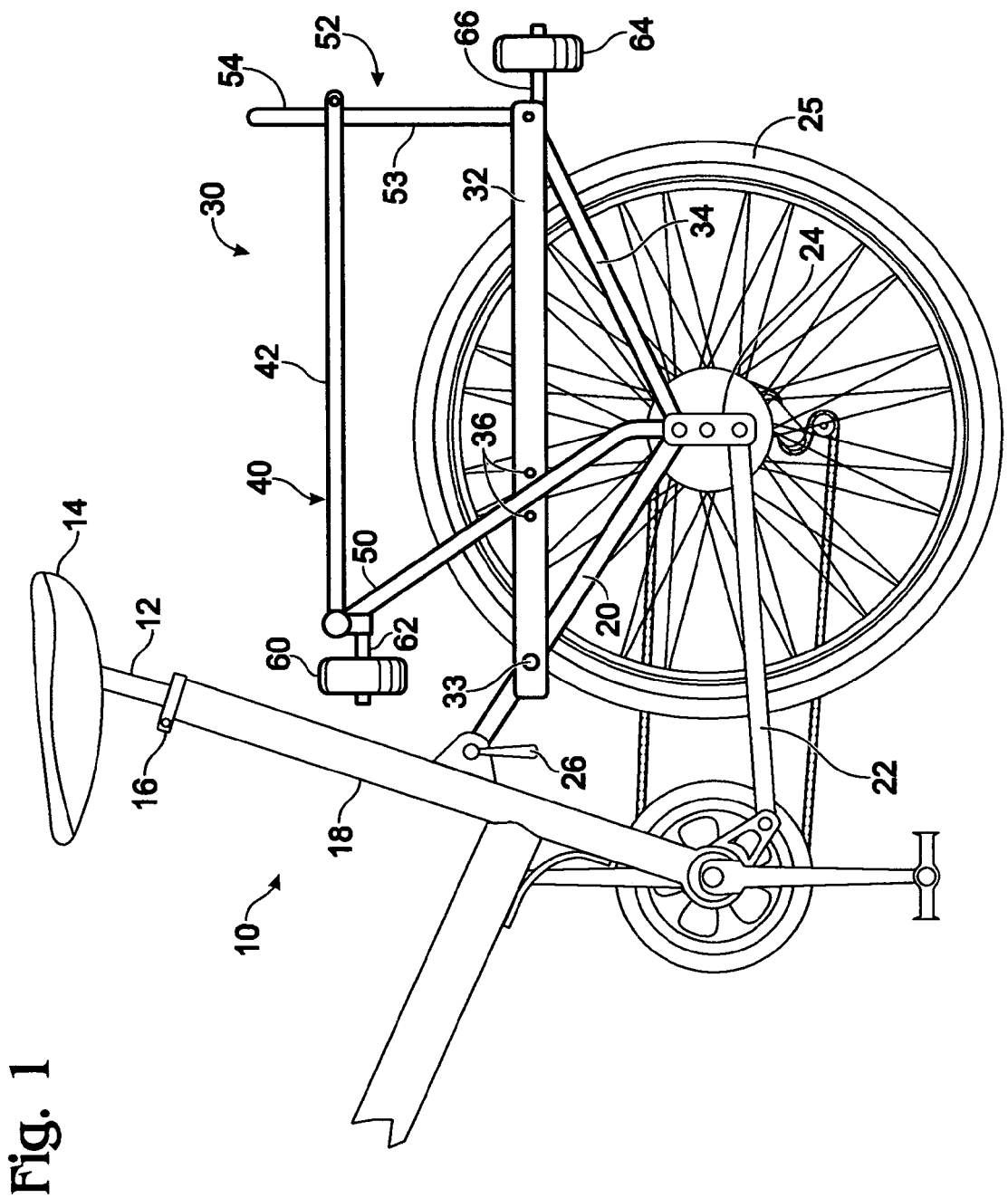
FIG. 1 is a left side elevational view of the rear of a folding bicycle showing the rear carrier rack of the present invention mounted thereon in its fully erected, load carrying mode.

The rear portion of a typical folding bicycle 10 is shown in FIG. 1. The folding bicycle includes a seat post 12 connected to a saddle 14. Seat post 12 is adjustably held by quick release clamp 16 within seat post tube 18. Left and right top stays 20 and 20', and left and right chain stays 22 (only the left chain stay being shown) are attached at their outer, trailing ends to rear dropout 24 of rear wheel 25. Left and right top stays 20, 20' are removably attached at their inner, leading end to seat post tube 18 by a quick release clamp 26.

The rear carrier rack 30 of the present invention includes left and right chassis bars 32, 32' pivotally supported adjacent their inner, leading ends to left and right top stays 20, 20' by axle 33, and pivotally supported at their outer, trailing ends to the upper ends of left and right rear support struts 34, 34'. The lower ends of left and right rear support struts 34, 34' are pivotally attached to the left and right sides of rear dropout 24.

Rear carrier rack 30 includes a load support platform 40. Support platform 40 is comprised of left and right longitudinally extending frame members 42, 42', front and rear cross frame members 44, 44'. Preferably a plurality of intermediate cross frame members 46 extend between and are attached to left and right longitudinally extending frame members 42, 42' which, together with frame members 42, 42' and 44, 44', form a bed for objects to be carried. However, a bed could be formed of webbing, mesh, etc., or formation of a bed could be omitted with objects being carried solely by frame members 42, 42' and 44, 44'. It is preferred that frame members 42 and 42', 44 and 44', and 46 and 46' be of a hollow tubular construction to conserve weight. The height of support platform 40 above rear bicycle wheel 25 is selected to allow a pannier to be carried.

The front end cross frame member 44 of support platform 40 is pivotally attached to the upper ends of left and right forward support struts 50, 50'. The lower ends of left and right forward support struts 50, 50' are pivotally attached to the left and right sides of rear dropout 24.

Left and right longitudinally extending frame members 42, 42' are pivotally attached at their outer, trailing ends to rear cross frame member 44' at left and right joints 43, 43', and pivotally attached at their inner, leading ends to front cross frame member 44 and left and right joints 45, 45'.

Rear support strut 52 includes left and right legs 53, 53', with a cross member 54 extending between the upper ends of legs 53, 53'. Cross member 54 is preferably integral with legs 53, 53' to thereby form a single inverted U-shaped strut 52. The lower ends of legs 53, 53' are pivotally attached to the left and right chassis bars 32, 32' adjacent their outer ends. Legs 53, 53' are attached to rear cross frame member 44' adjacent their upper ends. The legs 53, 53' are spaced further apart at their lower end than at their upper ends to accommodate the wider spacing of left and right chassis bars 32, 32'.

A forward trolley wheel 60 is attached to the left front end of support platform 40 by means of an axle assembly 62, and a rear trolley wheel 64 is attached to the left rear end of support platform 40 by means of an axle assembly 66. The trolley wheels 60 and 64 are preferably located on the same side of rear rack 10, and are shown positioned on the left side thereof. The major planes of trolley wheels 60 and 64 are parallel to each other, and perpendicular to the major plane of rear wheel 25 of folding bicycle 10, and are positioned to provide the widest possible wheel base to allow a "trolley" type pull of bicycle 10 when it and carrier rack 30 are in their folded modes.

Figure 2:
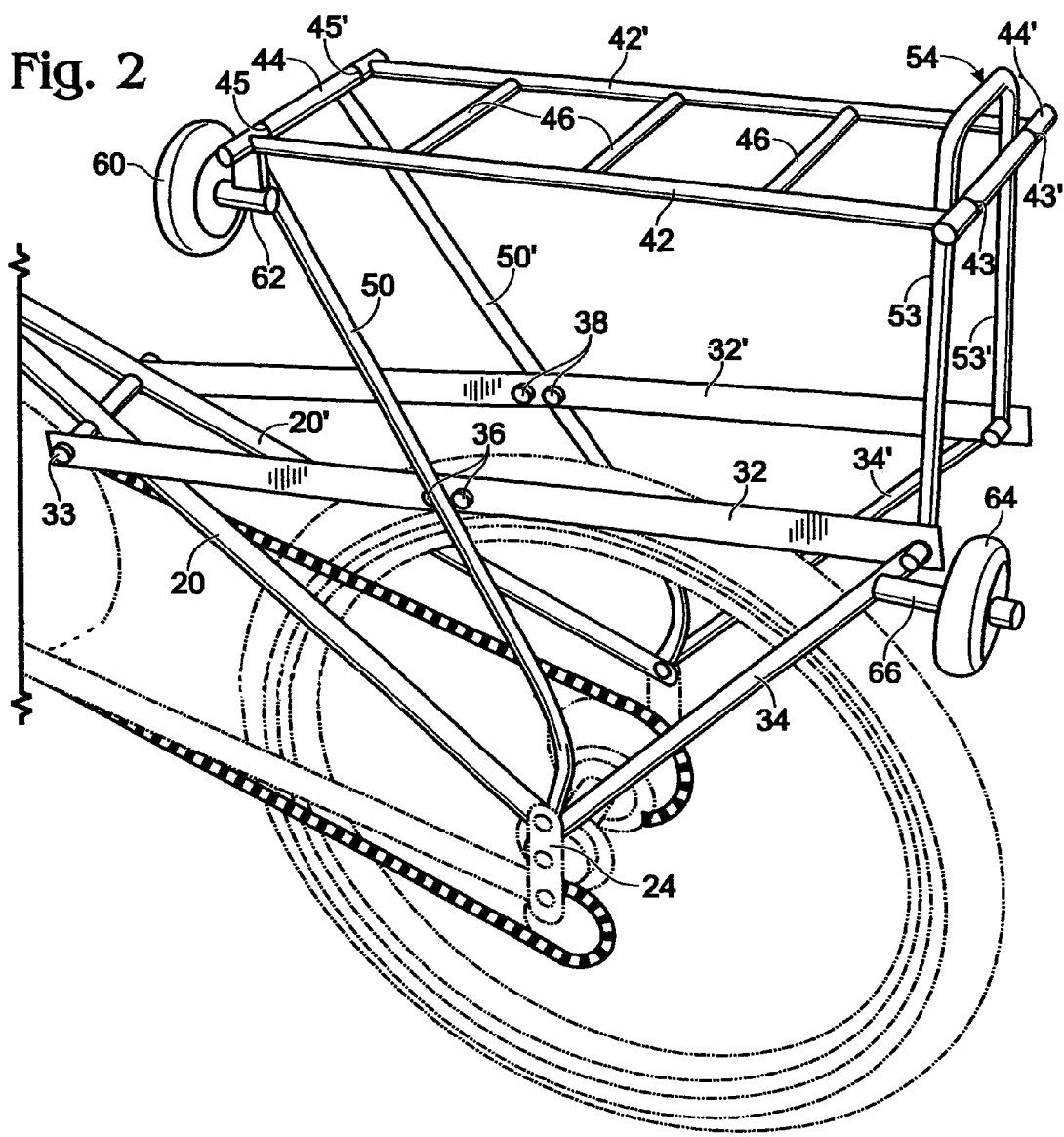
FIG. 2 is a left side perspective view of the rear carrier rack shown in its fully erected, load carrying mode.

FIGS. 1 and 2 show rear carrier rack 30 in its fully erected, load carrying mode. Support platform 40 is held in its erected position above chassis bars 32, 32' by releasable locking means. A suitable releasable locking means includes a pair of left locking pins 36 and a pair of right locking pins 38. The mid-portions of left and right forward support struts 50, 50' are positioned between and lockingly engage adjacent pairs of locking pins 36 and 38, respectively.

Figure 3:
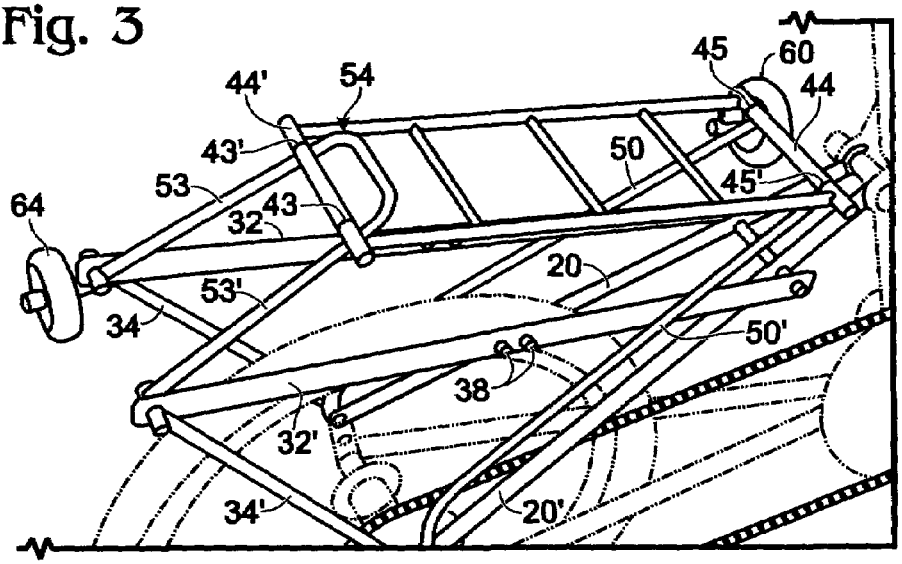
FIG. 3 is a left side perspective view of the rear carrier rack shown in a partially collapsed mode.

When rear carrier rack 30 is not being used to carry a load, it can be collapsed out of the way by pushing left and right chassis bars 32, 32' towards each other, thereby releasing left and right forward support struts from engagement with adjacent pairs of locking pins 36 and 38 and allowing support platform 40 to be moved forwardly and downwardly into contact with chassis bars 32, 32'. FIG. 3 shows support platform 40 in a position approximately mid-way between its fully erect position and its fully collapsed position.

Figure 4:
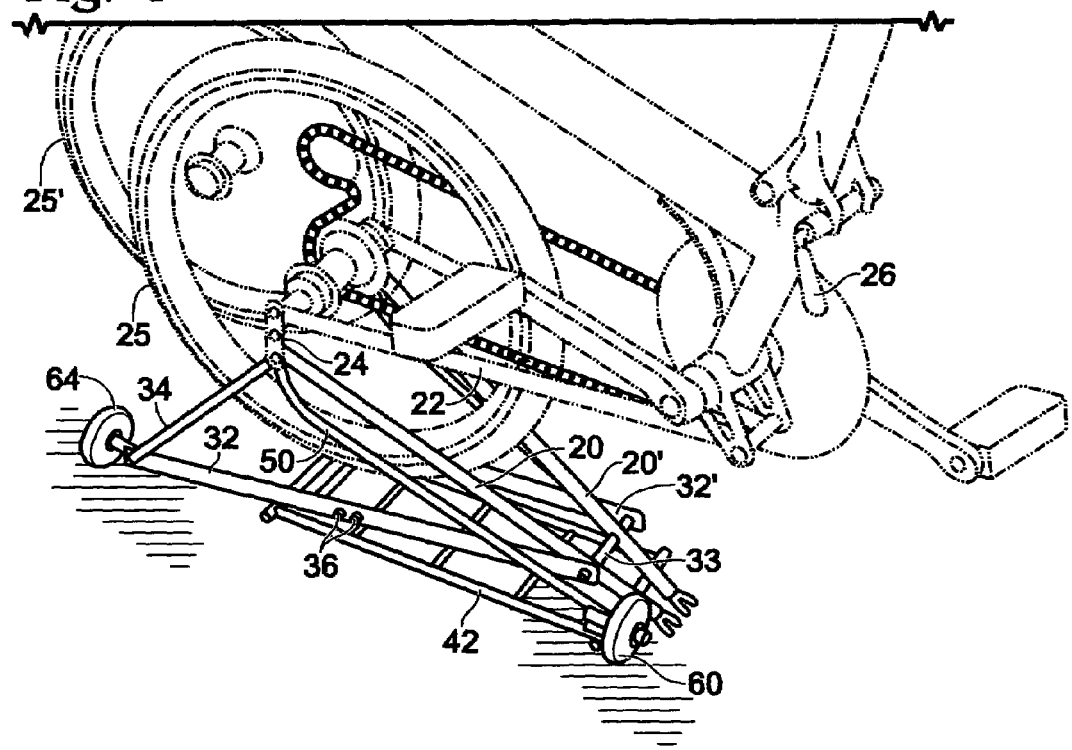
FIG. 4 is a left side perspective view of the rear carrier rack shown in its fully collapsed and folded mode during transport and storage of the folding bicycle to which it is attached.

When it is desired to fold the folding bicycle 10 to which rear carrier rack 30 is attached, support platform 40 is fully collapsed, as described above. Rear wheel 25 is rotated around until it is substantially parallel to the front wheel 25' in a manner well known in the folding bicycle art. Quick release 26 is actuated and releases seat stays 20 and 20'. Once seat stays 20 and 20' are released, chassis bars 32, 32' and support platform 40 can be rotated rearwardly until they are positioned beneath rear wheel 25, as shown in FIG. 4. In this position, wheels 60 and 64 are in contact with the floor or ground, and by tilting the folded bicycle towards the user, it can be moved with the wheels 60 and 64 acting as a trolley. In FIG. 4, inverted U-shaped rear support strut 52 is not shown for sake of clarity.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A collapsible and foldable rear carrier rack adapted to be mounted over a rear wheel of a folding bicycle comprising:
   - right and left chassis bars having inner and outer ends, said inner ends adapted to be pivotally attached to the right and left top stays of the folding bicycle;
   - a support platform positioned above said right and left chassis bars, said support platform having inner and outer ends and right and left sides;
   - right and left rear support struts having upper ends pivotally attached to said right and left chassis bars adjacent outer ends, said right and left support struts having lower ends adapted to be pivotally attached to the rear dropout of the folding bicycle;
   - upper ends of right and left forward platform support struts pivotally attached to said support platform adjacent its inner end, said right and left forward support struts having lower ends adapted to be pivotally attached to the rear dropout of the folding bicycle;
   - a rear platform support strut having right and left legs with upper and lower ends, said right and left legs being pivotally attached to said outer end of said support platform adjacent the upper ends of said legs, the lower ends of said right and left legs being pivotally attached to said right and left chassis bars adjacent the outer ends thereof; and
   - means for releasably locking said right and left forward support struts to said right and left chassis bars, respectively.

2. The rear rack of claim 1 including a first trolley wheel rotatably attached to the inner end of said support platform on its right or left side, and a trolley second wheel rotatably attached to the outer end of that chassis bar located on the same side of said rear rack as said first wheel.

3. The rear rack of claim 2 wherein said first and second trolley wheels have major planes that are parallel to each other and perpendicular to the major plane of said rear wheel of said folding bicycle.

4. The rear rack of claim 1 wherein said support platform includes right and left longitudinally extending frame members having inner and outer ends, a front cross frame member extending between and attached to said right and left longitudinally extending frame members adjacent the inner ends thereof, and a rear cross frame member extending between and attached to said right and left longitudinally extending frame members adjacent the outer ends thereof.

5. The rear rack of claim 4 wherein said support platform additionally includes a plurality of cross frame members extending between and attached to said right and left longitudinally extending frame members.

6. The rear rack of claim 5 wherein said frame members are formed from hollow tubes.

7. The rear rack of claim 1 wherein said upper ends of said right and left legs of said rear platform support strut extend above said support platform, and a cross member extends between said upper ends and is attached thereto to thereby form an inverted U-shaped member.

8. The rear rack of claim 1 wherein said means for releasably locking said right and left forward support struts to said right and left chassis bars includes a pair of right locking pins located at a mid-portion of the outer surface of said right chassis bar and a pair of left locking pins located at a mid-portion of the outer surface of said left chassis bar, said pair of right locking pins adapted to engage and hold said right forward support strut and said pair of left locking pins adapted to engage and hold said left forward support strut, said right and left pairs of pins adapted to disengage said right and left forward support struts upon movement of said right and left chassis bars towards each other.

9. A rear rack for a folding bicycle comprising:
right and left chassis bars having inner and outer ends, said inner ends adapted to be pivotally attached to the right and left top stays of the folding bicycle;
a support platform positioned above said right and left chassis bars, said support platform including right and left longitudinally extending frame members having inner and outer ends, a front cross frame member extending between and attached to said right and left longitudinally extending frame members adjacent the inner ends thereof, a rear cross frame member extending between and attached to said right and left longitudinally extending frame members adjacent the outer ends thereof, and a plurality of cross frame members extending between and attached to said right and left longitudinally extending frame members;
right and left rear support struts having upper ends pivotally attached to said right and left chassis bars adjacent outer ends, said right and left support struts having lower ends adapted to be pivotally attached to the rear dropout of the folding bicycle;
upper ends of right and left forward support struts pivotally attached to said support platform adjacent its inner end, said right and left forward support struts having lower ends adapted to be pivotally attached to the rear dropout of the folding bicycle;
a generally inverted U-shaped rear support strut having right and left legs having upper and lower ends and a cross member extending between and attached to the upper ends of said right and left legs, the upper portions of said right and left legs being pivotally attached to said support platform adjacent its outer end, the lower ends of said right and left legs being pivotally attached to said right and left chassis bars adjacent the outer ends thereof; and
means for releasably locking said right and left forward support struts to said right and left chassis bars, respectively, said means including a pair of right locking pins located at a mid-portion of the outer surface of said right chassis bar and a pair of left locking pins located at a mid-portion of the outer surface of said left chassis bar, said pair of right locking pins adapted to engage and hold said right forward support strut and said pair of left locking pins adapted to engage and hold said left forward support strut, said right and left pairs of pins disengaging said right and left forward support struts upon movement of said right and left chassis bars towards each other.

* * * * *